(12) United States Patent
Wang

(10) Patent No.: US 12,005,772 B2
(45) Date of Patent: Jun. 11, 2024

(54) HYBRID PLUG-IN BATTERY AND HYDROGEN FUEL ENGINE VEHICLE WITH SWAPPABLE HYDROGEN TANKS AND METHOD FOR MODULAR HYDROGEN STORAGE AND TRANSPORTATION AND DISTRIBUTION

(71) Applicant: Yonghua Wang, Klamath Falls, OR (US)

(72) Inventor: Yonghua Wang, Klamath Falls, OR (US)

(73) Assignee: Yonghua Wang, Klamath Falls, OR (US)

( * ) Notice: Subject to any disclaimer, the term of this patent is extended or adjusted under 35 U.S.C. 154(b) by 331 days.

(21) Appl. No.: 17/300,409

(22) Filed: Jun. 17, 2021

(65) Prior Publication Data
US 2022/0402354 A1    Dec. 22, 2022

(51) Int. Cl.
| | |
|---|---|
| *B60K 15/03* | (2006.01) |
| *B60K 15/00* | (2006.01) |
| *F02B 13/10* | (2006.01) |
| *F02B 43/10* | (2006.01) |
| *H01M 10/42* | (2006.01) |
| *H01M 10/44* | (2006.01) |
| *H01M 10/46* | (2006.01) |
| *H02J 7/35* | (2006.01) |

(52) U.S. Cl.
CPC ............. *B60K 15/03* (2013.01); *B60K 15/00* (2013.01); *F02B 13/10* (2013.01); *H01M 10/4257* (2013.01); *H01M 10/44* (2013.01); *H01M 10/465* (2013.01); *H02J 7/35* (2013.01); *B60K 2015/03184* (2013.01); *B60K 2015/03315* (2013.01); *F02B 2043/106* (2013.01); *H01M 2010/4278* (2013.01); *H01M 2220/20* (2013.01); *Y02E 60/36* (2013.01)

(58) Field of Classification Search
CPC .................... B60K 15/03; B60K 15/01; B60K 2015/03184; B60K 2015/03315; F02B 43/10; F02B 2043/106; H01M 10/4257; H01M 10/44; H01M 10/465; H01M 2010/4278; H01M 2220/20; H02J 7/35; H02J 2300/30; H02J 2310/48; H02J 15/008; B60L 50/50
See application file for complete search history.

(56) References Cited

U.S. PATENT DOCUMENTS

2010/0252088 A1*  10/2010  Fein ........................ B60L 53/52
136/252

FOREIGN PATENT DOCUMENTS

GB              2452141 A  *  2/2009  ............... B60K 6/32

* cited by examiner

*Primary Examiner* — Michael C Zarroli

(57) ABSTRACT

A hybrid plug-in battery and hydrogen fuel internal combustion engine vehicle with swappable modular hydrogen tanks and integrated with solar power generation system comprises: a plug-in chargeable battery bank; a hydrogen fuel internal combustion engine; a water electrolysis system; a solar electric power generation system; and multiple modular swappable hydrogen tanks. The hybrid electric vehicle can be electrically charged by using electric charging infrastructure and mechanically charged by swapping hydrogen tanks. The introduction of the water electrolysis system into the new structure of the hybrid vehicle enables onboard hydrogen generation. The swappable hydrogen tanks comprise sensors and wireless communication electronic terminals to be shared by all vehicles.

6 Claims, 5 Drawing Sheets

HYBRID PLUG-IN BATTERY AND HYDROGEN FUEL ENGINE VEHICLE WITH SWAPPABLE HYDROGEN TANKS AND METHOD FOR MODULAR HYDROGEN STORAGE AND TRANSPORTATION AND DISTRIBUTION

TECHNICAL FIELD

The present disclosure relates generally to hybrid battery and hydrogen fuel vehicles and modular energy storage systems, more specifically, to hydrogen tank swappable hybrid plug-in battery and hydrogen fuel engine vehicles with integrated solar power generation system and method for modular hydrogen storage, transportation and distribution.

BACKGROUND

The current hydrogen storage, transportation, and distribution system is based on centralized large scale high pressure tanks. The generated hydrogen is charged into centralized large scale high pressure tanks for storage, then the stored hydrogen is charged to centralized tanks of trucks for transportation, and finally the transported hydrogen is charged into centralized tanks in charging stations for further charging hydrogen vehicles. During the entire process, multiple charging processes involve in the hydrogen storage, transportation and distribution making the process intricate and significantly increasing the risks of causing safety issues. The present invention creates a method to use modular hydrogen tanks to replace the centralized tanks for storage, transportation, and distribution of hydrogen to avoid charging processes. The modular swappable hydrogen tanks are equipped with wireless communication electronic terminals with sensors for sharing. Furthermore, the present invention creates a hybrid plug-in battery and hydrogen fuel engine vehicle to complete the process from hydrogen generation to hydrogen utilization.

In general, there are essentially two categories of Electric Vehicle (EV), battery EV, and fuel cell EV. Fuel cell EV is a typical vehicle based on hydrogen fuel. Although the battery based EV is dominated over the world, hydrogen based fuel cell EV demonstrates high energy conversion efficiency, and super environment compatibility. As the core of hydrogen economy, fuel cell EV should be widely adopted and used to replace the fossil fuel based vehicles. However, the cost of fuel cell system is 100 times that of gasoline engine and makes the fuel cell EV almost prohibitively expensive. Fortunately, the advances of the research and development of hydrogen fuel vehicles enable the hydrogen based internal combustion engine vehicle. Very few of modifications of gasoline engines are needed to turn the gasoline fuel based vehicles into hydrogen fuel vehicles. This transition will lock the cost of hydrogen fuel vehicles to the level of gasoline vehicles. In order to complete the modular hydrogen storage, transportation, distribution and utilization process, the present invention creates a swappable hydrogen tank hydrogen fuel engine vehicle.

Wherein, the new concept of "swappable hydrogen tank" is defined as a high pressure hydrogen tank with a lockable and un-lockable mechanical means to connect to vehicle structure, an automatic controlled high pressure pipe connector to connect to other components and an automatic controlled valve, an automatic controlled electric connector to connect to other electric components and an automatic controlled electric switch.

Relative to battery based EV and fuel cell based EV, the hydrogen fuel engine vehicle does not directly generate electric power or carry large capacity battery, therefore is unable to strongly support those power intensive terminal users such as autonomous drive system and heating and cooling system. As a direct solution, a solar photovoltaic system is integrated on the roof or body of the hydrogen fuel vehicle to supply power to the hydrogen tank control system, autonomous drive system and other electric appliances.

In order to couple the plug-in chargeable battery system to the hydrogen fuel engine system, and store the surplus electric power generated by the photovoltaic system, a water electrolysis system is integrated into the hydrogen fuel engine vehicles to generate hydrogen by using the stored electric power in the plug-in chargeable battery system. The addition of the water electrolysis system to the hybrid plug-in chargeable battery and hydrogen fuel engine vehicle system enables the onboard hydrogen generation and direct hydrogen feed-in the hydrogen fuel engine of the system.

Conventional hydrogen generation, transportation, and distribution system involves three major processes: centralized hydrogen generation, centralized hydrogen tank truck transportation, and centralized charging station distribution. There are three hydrogen charging processes involved: truck tank charging, charging station storage tank charging, and vehicle tank charging. The swappable hydrogen tank hydrogen fuel vehicles are able to share the swappable hydrogen tanks with the solar powered hydrogen generation station network and eliminate the hydrogen charging processes.

U.S. Pat. No. 8,963,481 B2 granted to Prosser et al (Prosser) disclosed charging service vehicles and methods using modular batteries. In Prosser's disclosure, modular batteries are delivered to battery swappable EVs to replace the exhausted modular batteries. Although Prosser's vehicle is equipped with charging system, their vehicle is not powered by their modular batteries. Obviously, the battery swappable vehicles and the battery transport and distribution system are different from the hydrogen tank swappable vehicles and the modular hydrogen tank storage, transportation and distribution system. Due to the much higher energy density of hydrogen fuel, hydrogen tank swappable vehicles and the modular hydrogen tank storage, transportation and distribution system will demonstrate much higher superiority over battery swappable system.

SUMMARY

According to the present invention, the renewable energy or other energy generated hydrogen is directly charged into the swappable modular hydrogen storage tanks, then the swappable modular tanks are transported to charging stations or other places for distribution, finally the swappable modular storage tanks are directly swapped with the exhausted swappable modular storage tanks inside of the hydrogen fuel vehicles. In this process, the swappable modular storage tanks go through the whole process undergoing only one charging and function as storage, transportation, distribution, and utilization units all way down. The swappable modular storage tanks are equipped with wireless communication electronic terminals with sensors for tracking and sharing.

As the terminal user of hydrogen, the hydrogen fuel engine vehicle consists of a modified conventional gasoline engine for hydrogen combustion, multiple swappable hydrogen tanks, a water electrolysis system, a plug-in chargeable battery system, and a photovoltaic system integrated on the roof or body of the vehicle. Fully charged swappable modular hydrogen tanks can be used to exchange with the multiple swappable hydrogen tanks after their stored hydrogen is exhausted. The water electrolysis system, in conjunction with the photovoltaic power generation system and the plug-in chargeable battery bank system, provides the complementary hydrogen supply, when the hydrogen tank swapping service is not available. Furthermore, the water electrolysis system to the vehicle system also makes it possible to make full use of the widely available electric vehicle charging stations to supply hydrogen. In other words, the hybrid plug-in chargeable battery and hydrogen fuel engine vehicles are supported by both of the electric vehicle charging infrastructure and the hydrogen charging infrastructure.

The present invention enables the direct exchange of hydrogen tanks between the hydrogen generation station network and hydrogen fuel engine vehicles and dramatically simplifies the hydrogen generation, transportation, and distribution process. By sharing the swappable hydrogen tanks, the renewable energy hydrogen generation systems can also save hydrogen storage system.

As the general trends, the auto industry is accelerating in transition to autonomous vehicles and internet connected vehicles. Hydrogen fuel vehicles directly combust hydrogen to turn chemical energy into mechanical energy without electric power generation, and therefore have a drawback in power supply to support autonomous drive system, internet connecting system, and hydrogen tank control system. The present invention integrates a photovoltaic system to the roof or body of the hydrogen fuel vehicle to mitigate this drawback.

Contrast to the battery based electric vehicles and the fuel cell based electric vehicles, the hydrogen fuel engine vehicles are potentially 100 times cheaper than their counterparts due to the fact that fuel cell system is 100 times more expensive than gasoline engine, and can take advantage of the existing infrastructure and the entire exiting conventional auto-industry systems. The present invention mitigates almost all of the issues related to hydrogen generation, transportation, and distribution. The swappable hydrogen tanks can also facilitate the renewable energy generated hydrogen storage.

Comparing with fuel cell EV which requires the hydrogen with purity over 99.99%, the hydrogen fuel vehicle has almost no requirement to the purity of hydrogen. This will dramatically promote solar powered hydrogen generation, especially distributed hydrogen generation.

The adaption of the hydrogen tank swappable hydrogen fuel vehicles and the swappable modular hydrogen tank storage, transportation and distribution system enables the hydrogen tank exchange anywhere, apart from charging stations, therefore releases the requirement for constructing this type of infrastructure.

The addition of the water electrolysis system to the hydrogen fuel vehicle system enables the onboard hydrogen generation from sunlight and eliminates the hydrogen transportation and distribution processes.

The plug-in chargeable battery system, in conjunction with the water electrolysis system, not only provides a storage system for the integrated photovoltaic system and supply power to the autonomous drive system, control system, and other power consuming systems, but also provides a transition system to supply power to transform electric power into hydrogen. This transition enables the hybrid plug-in chargeable battery and hydrogen fuel engine vehicle to make full use of the both electric vehicle charging infrastructure and hydrogen charging infrastructure.

Further aspects and advantages of the present invention will become apparent upon consideration of the following description thereof, reference being made of the following drawing.

BRIEF DESCRIPTION OF THE DRAWINGS

The accompanying drawings, which are incorporated in and constitute a part of this specification, illustrate an embodiment of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
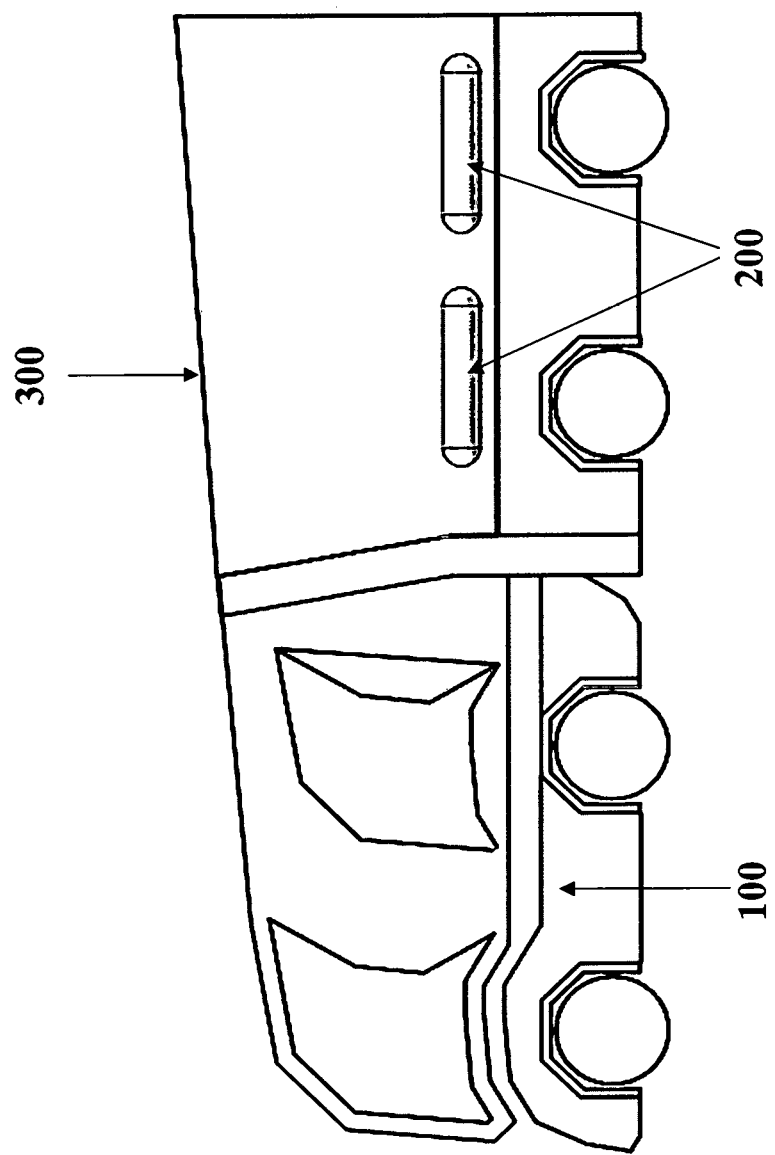
FIG. 1 is the schematic indication of the hybrid plug-in chargeable battery and hydrogen fuel engine vehicle with swappable hydrogen tanks.

Referring to FIG. 1, the hybrid plug-in chargeable battery and hydrogen fuel engine vehicle with swappable hydrogen tanks consists of a hybrid plug-in chargeable battery and hydrogen fuel engine vehicle 100, multiple swappable modular hydrogen storage tanks 200, and a photovoltaic system 300 integrated on the roof of the vehicle.

Figure 2:
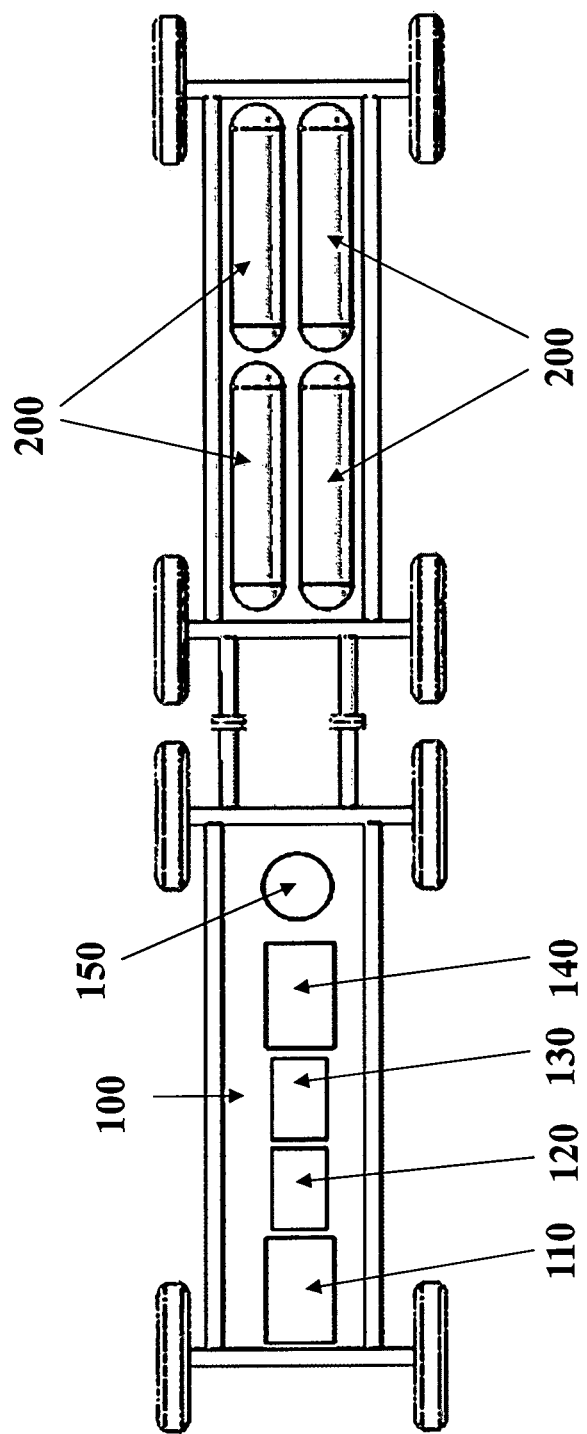
FIG. 2 is the system structure of the hybrid plug-in chargeable battery and hydrogen fuel engine vehicle with swappable hydrogen tanks.

Referring to FIG. 2, the power train of the hybrid plug-in chargeable battery and hydrogen fuel engine vehicle with swappable hydrogen tanks comprises the plug-in battery bank 110, the onboard charger 120, the control system 130, the water electrolysis system 140, the hydrogen fuel engine 150, and the swappable hydrogen tanks 200. The photovoltaic system will power the water electrolysis system to generate hydrogen to charge the modular hydrogen tanks during the daytime on sunny days, the plug-in chargeable battery system will power the water electrolysis system to generate hydrogen to charge the modular hydrogen tanks during night and cloudy days. The modular hydrogen tanks, which can be swapped to replenish the hydrogen, supply hydrogen to the hydrogen fuel engine to drive the vehicle. The configuration of the hybrid plug-in chargeable battery and hydrogen fuel engine vehicle with swappable hydrogen tanks is able to obtain the energy replenishment from solar radiation, electric vehicle charging network, and hydrogen charging network simultaneously.

Figure 3:
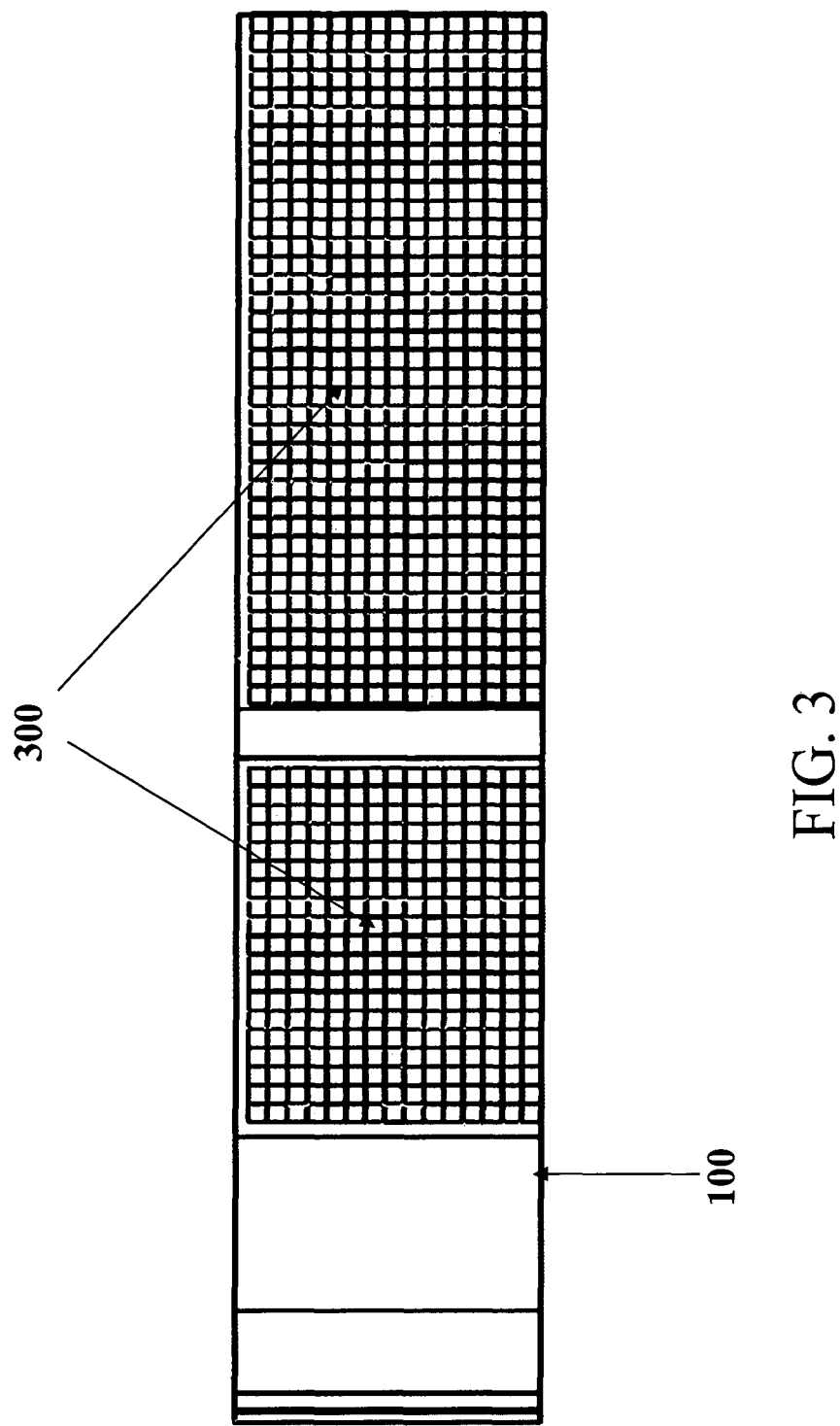
FIG. 3 is the top view of the photovoltaic system integrated on the roof of the hybrid plug-in battery and hydrogen fuel engine vehicle with swappable hydrogen tanks.

Referring to FIG. 3, the photovoltaic panels 300 are integrated on the roof top of the hybrid plug-in battery and hydrogen fuel engine vehicle with swappable hydrogen tanks.

Figure 4:
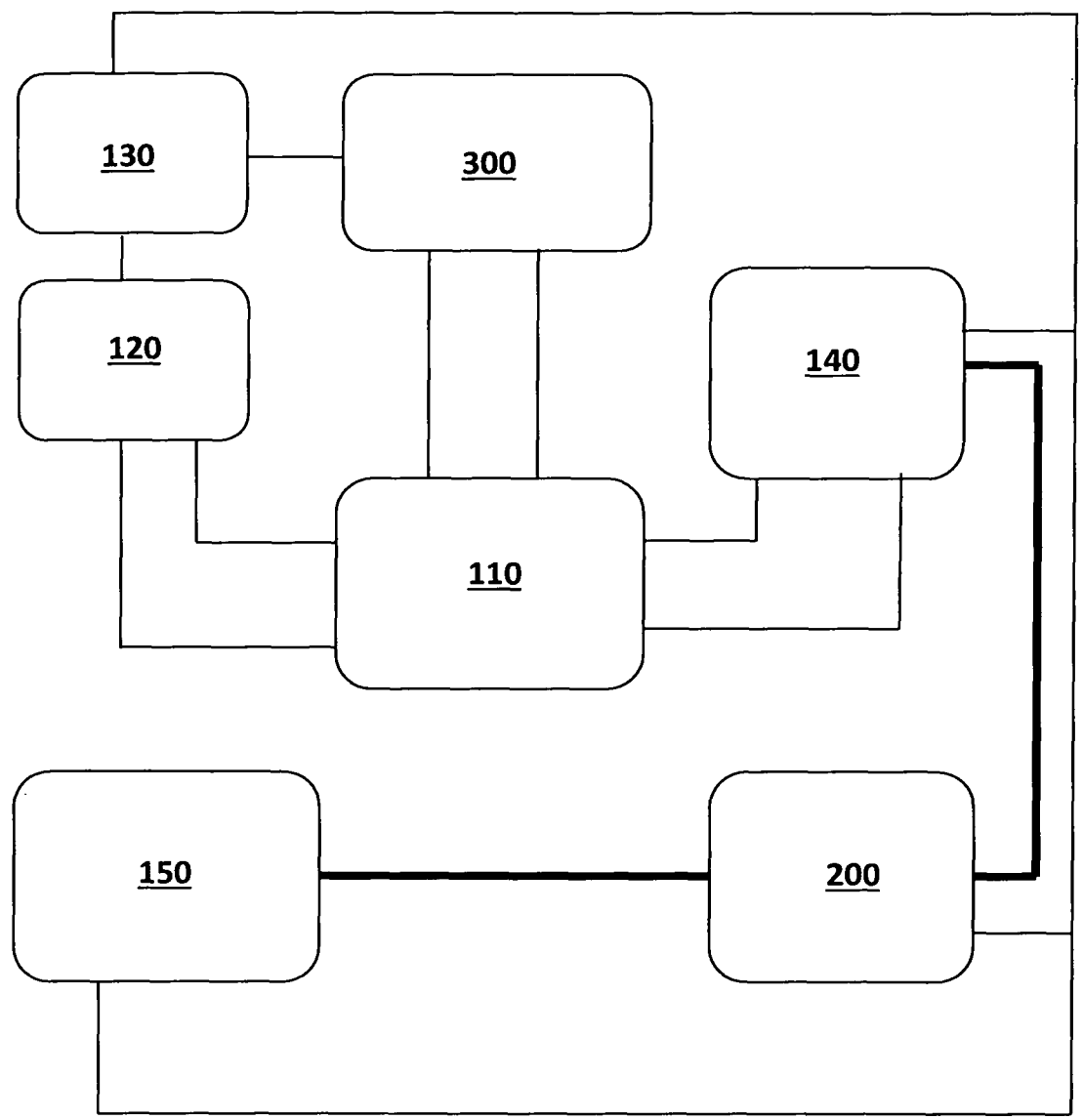
FIG. 4 is the schematic configuration of the individual components of the hybrid plug-in chargeable battery and hydrogen fuel engine vehicle with swappable hydrogen tanks.

Referring to FIG. 4, the onboard charger 120 is connected to the plug-in chargeable battery bank 110 through electric cables; the photovoltaic power generation system 300 is also connected to the plug-in chargeable battery bank 110 through electric cables; the plug-in chargeable battery bank 110 is connected to the water electrolysis system 140 through electric cables; the water electrolysis system is connected to the swappable hydrogen tanks 200 through high pressure pipes; the swappable hydrogen tanks 200 are connected to the hydrogen fuel engine through high pressure pipes; and all of the above components are connected to the control system 130; the control system 130 has a wireless communication electronic terminal with sensors to detect the components.

Figure 5:
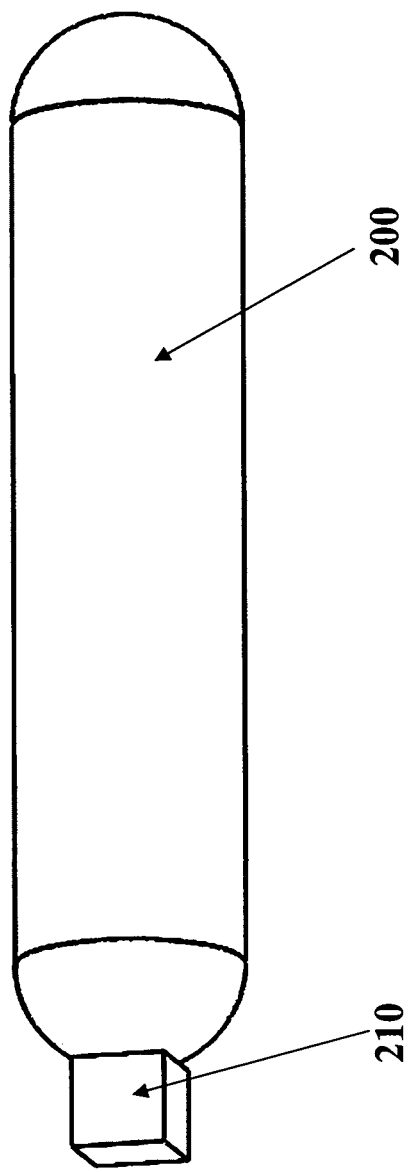
FIG. 5 is the view of the swappable hydrogen tank with a wireless communication electronic terminal with sensors.

Referring to FIG. 5, the swappable hydrogen tanks 200 has a wireless communication terminal 210 with sensors.

From the description above, a number of advantages of the hybrid plug-in chargeable battery and hydrogen fuel engine vehicle with swappable hydrogen tanks and integrated with photovoltaic power generation system become evident. The swappable hydrogen tanks simplify the hydrogen storage, transportation, and distribution processes and avoid the construction of the hydrogen charging station infrastructure. The hybrid plug-in chargeable battery and hydrogen fuel engine configuration, in conjunction with water electrolysis system, enables the energy replenishment of the vehicle from both of the electric vehicle charging station network and the hydrogen distribution network. Relative to the conventional battery based electric vehicle, the size of battery bank is dramatically reduced. Relative to the fuel cell based electric vehicle, the hydrogen fuel engine vehicle has great potential to dramatically reduce the cost of the vehicle. The introduction of the water electrolysis system realizes the onboard hydrogen generation and significantly reduces the risk of safety issues.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A hybrid plug-in chargeable battery bank and hydrogen fuel engine vehicle with swappable hydrogen tanks comprises:
 (a) a plug-in chargeable battery bank;
 (b) a hydrogen fuel engine;
 (c) a water electrolysis system;
 (d) multiple swappable modular hydrogen tanks;
 (e) a photovoltaic power generation system;
 (f) and a control system;
 Wherein, the photovoltaic power generation system is electrically coupled to the plug-in chargeable battery bank to charge the battery bank; the plug-in chargeable battery bank is electrically coupled to the water electrolysis system to generate hydrogen to charge the swappable modular hydrogen tanks; and the hydrogen tanks supply hydrogen to the hydrogen fuel engine through high pressure pipes;
 When in operation, in sunny days, the solar radiation is collected and converted into electric power by the photovoltaic power generation system to store in the plug-in chargeable battery bank for powering the water electrolysis system to generate hydrogen; in cloudy days or at nights, the plug-in chargeable battery bank is charged by electric vehicle charging station for powering the water electrolysis system to generate hydrogen, or the swappable hydrogen tanks are directly swapped at hydrogen charging stations or other places to supply hydrogen; with constant hydrogen supply, the hydrogen fuel engine is employed to drive the vehicle by combusting the hydrogen.

2. The hybrid plug-in chargeable battery bank and hydrogen fuel engine vehicle of claim 1 comprises an onboard charger, a plug-in chargeable battery bank, a control system, a water electrolysis system, and a hydrogen fuel engine; wherein, the onboard charger is electrically coupled to the plug-in chargeable battery bank through electric cables; the plug-in chargeable battery bank is electrically coupled to the water electrolysis system through electric cables; the control system is electrically coupled to every electrical component of the vehicle.

3. The water electrolysis system of claim 2 is connected to the multiple swappable hydrogen tanks of claim 1 through high pressure pipes.

4. The multiple swappable hydrogen tanks of claim 2 are connected to the hydrogen fuel engine through high pressure pipes.

5. The multiple swappable hydrogen tanks of claim 1 comprises at least one sensor for temperature measurement, at least one sensor for pressure measurement, and a wireless communication electronic terminal for connecting to internet.

6. The control system of claim 2 comprises a wireless communication electronic terminal for connecting to internet.

* * * * *